Figure 7:
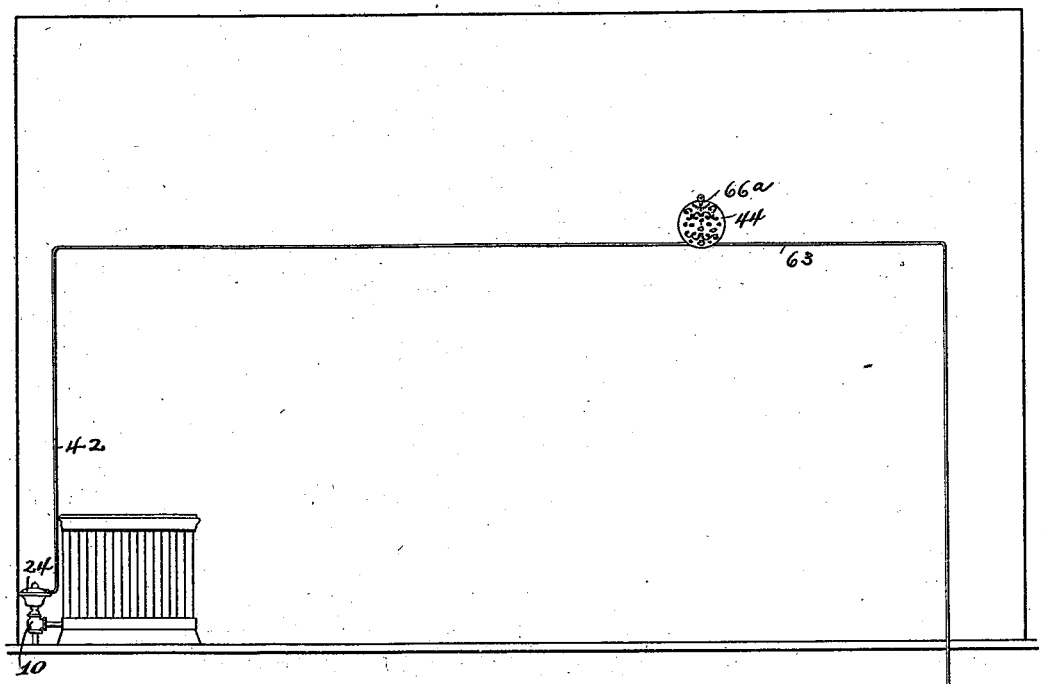

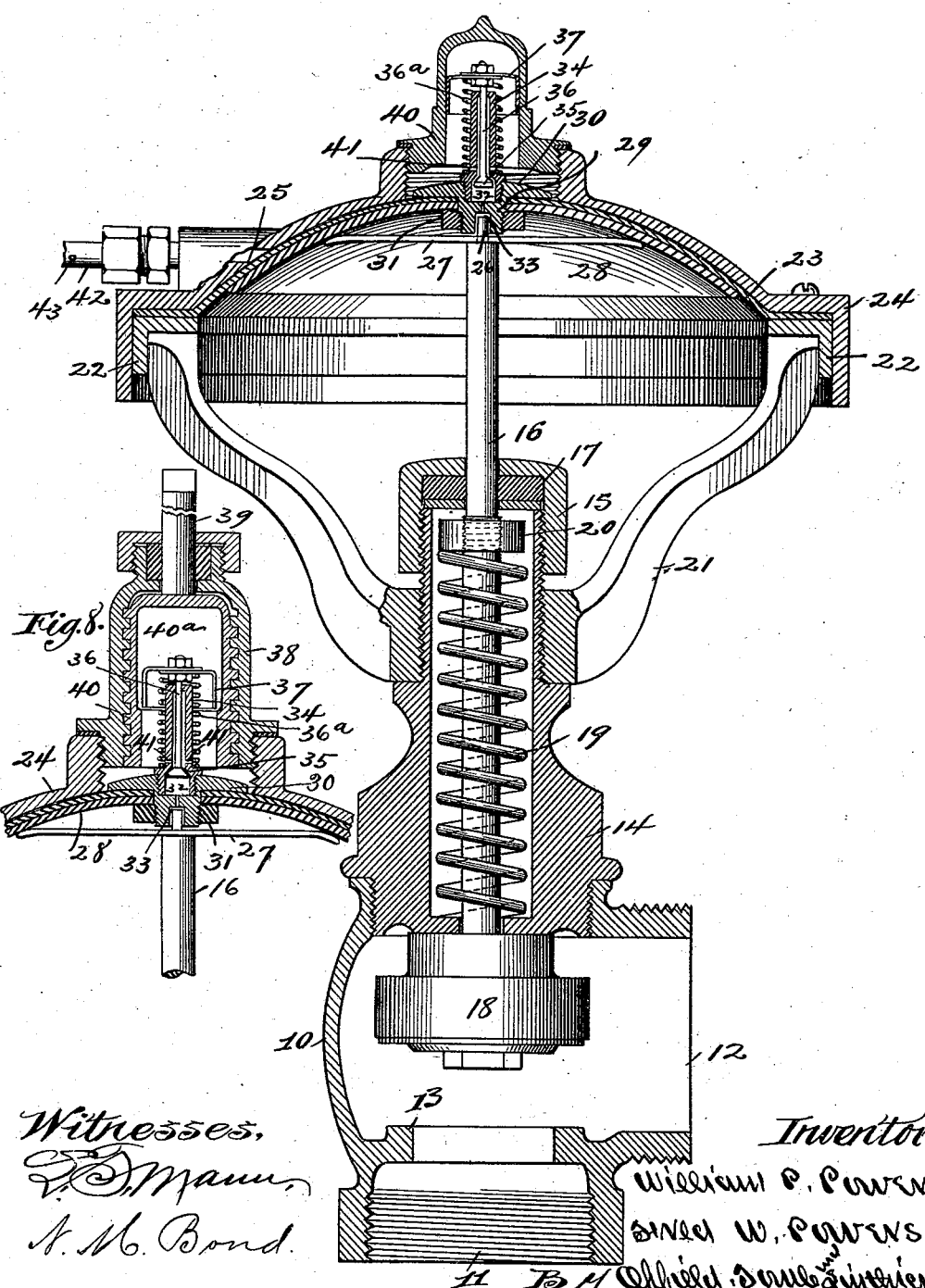

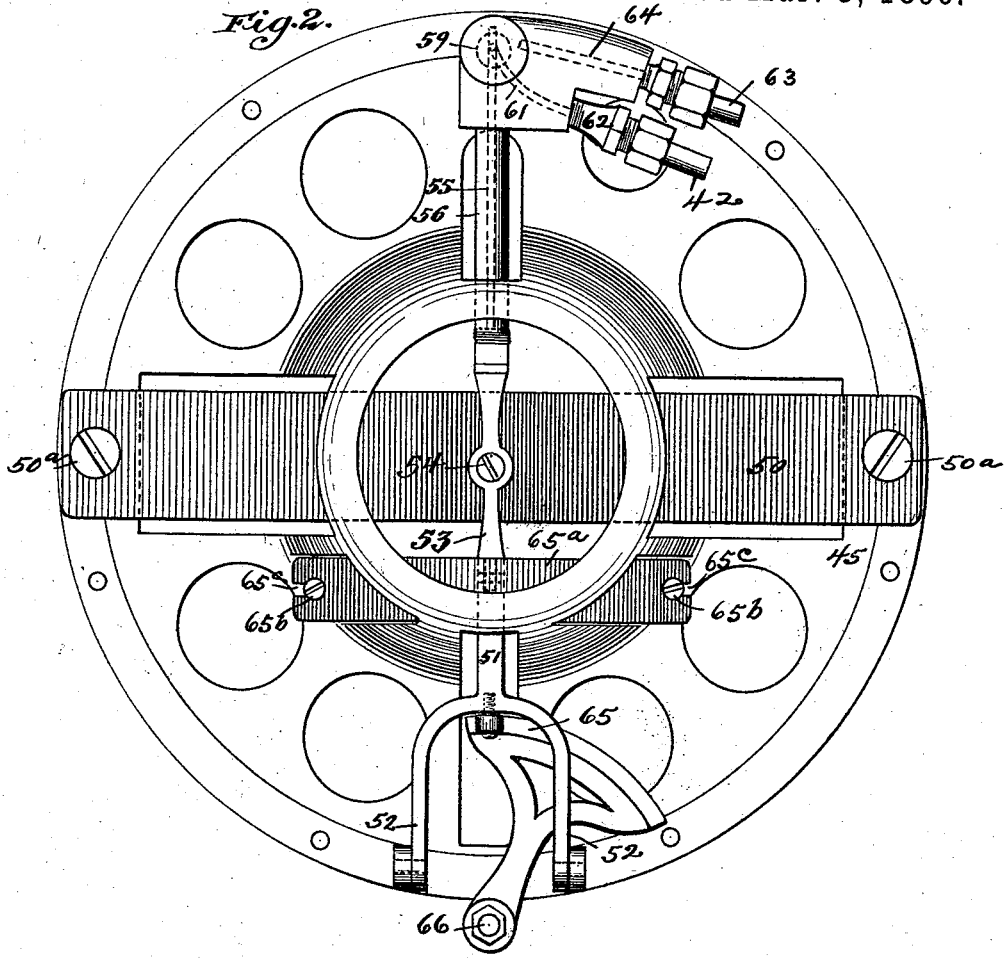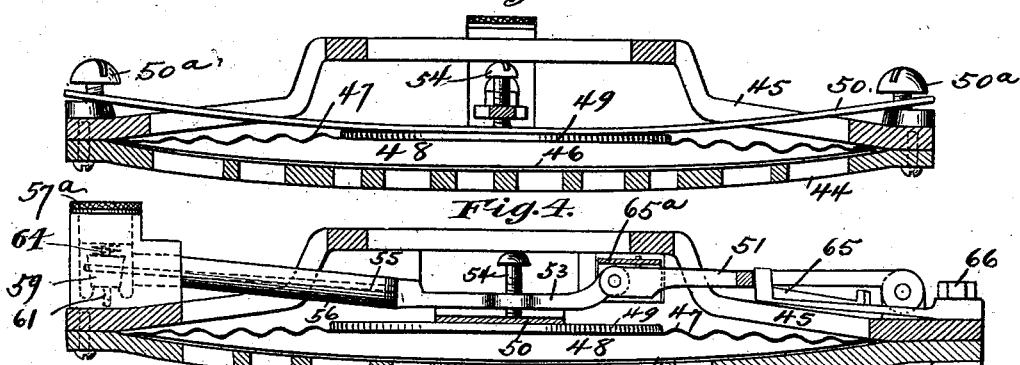

(No Model.) 3 Sheets—Sheet 3.
W. P. & F. W. POWERS.
TEMPERATURE REGULATING APPARATUS.

No. 555,660. Patented Mar. 3, 1896.

UNITED STATES PATENT OFFICE.

WILLIAM P. POWERS AND FRED W. POWERS, OF CHICAGO, ILLINOIS.

TEMPERATURE-REGULATING APPARATUS.

SPECIFICATION forming part of Letters Patent No. 555,660, dated March 3, 1896.

Application filed October 22, 1895. Serial No. 566,448. (No model.)

*To all whom it may concern:*

Be it known that we, WILLIAM P. POWERS and FRED W. POWERS, of Chicago, Illinois, have invented certain new and useful Improvements in Temperature-Regulating Apparatus, of which the following is a specification.

This invention relates to that class of temperature-controlling apparatus in which a valve for controlling the supply of heat is opened and closed by a fluid-pressure motor and in which the pressure fluid is controlled by the action of a thermostat.

The object of the invention is to provide an apparatus of simple construction which will close and open the valve quickly and by slight changes of temperature, and to this end the gradually-applied power of a thermostat must be converted into a rapidly-acting power upon the pressure device, or, in other words, the gradual action of the thermostat results in a positive and rapid action of the pressure device, so that the valve is opened wide and closed tight, and accumulation of water in the radiators and consequent hammering is avoided.

In carrying out our invention we preferably employ a vapor-thermostat, consisting of a pressure-chamber having a movable wall. Within the pressure-chamber a body of volatile liquid is confined, and this liquid, vaporizing at about the temperature desired to be maintained, causes the wall or diaphragm to move and by means of suitable intermediate mechanism opens a valve to permit the passage of the motor fluid to a fluid-pressure motor, whereby the heat-controlling valve is operated, the parts being preferably so arranged that when the temperature rises the thermostat-valve opens, the pressure-fluid enters the motor and the latter effects the closing of the heat-controlling valve. When the temperature falls the thermostat-valve closes, the motor is depleted, the controlling-valve opens and the supply of heat is increased.

Obviously the expansion of the vapor of the thermostat makes the latter gradual in its action, and it becomes necessary therefore to provide means whereby this gradually increasing or diminishing pressure shall result in a positive and quick movement of the valve controlling the supply of heat. For this purpose we provide the fluid-pressure motor with an automatic escape-valve. This escape-valve is of such construction and so connected with the fluid-pressure motor that it permits the motor fluid to escape during the initial action of the thermostat and until such time as the valve controlling the motor-fluid supply is opened sufficiently to permit the passage of an excess of fluid-pressure over that passing through the escape-valve sufficient to preponderate over the tension of the spring which tends to hold the main valve open. Thereupon the motor is actuated sufficiently to close the escape-valve and the full pressure of the motor fluid becomes operative at once, causing the motor to act quickly to close the valve controlling the supply of heat, and when the temperature has fallen the thermostat cuts off or reduces the supply of motor fluid to the motor. At some convenient point in the connection between the thermostat and the motor is provided a small escape-aperture, which is always open, thus permitting a gradual escape of a small amount of the motor fluid, and thus results when the supply has been reduced or cut off in gradually depleting the motor fluid and permitting a slight return movement of the motor-piston in response to an actuating-spring operating against the motor-fluid pressure. As soon as this retrograde movement commences, the escape-valve is unseated, thereby opening a passage to the atmosphere for the motor fluid and permitting an immediate and positive opening movement of the valve controlling the supply of heat. This opening and closing alternates in response to slight changes of temperature, as the thermostat is highly sensitive.

In the accompanying drawings we have shown an apparatus representing a practical embodiment of our invention and including novel combinations of parts and structural features forming the subject-matter of our invention, as will be hereinafter described and particularly pointed out in the claims.

Figure 6:
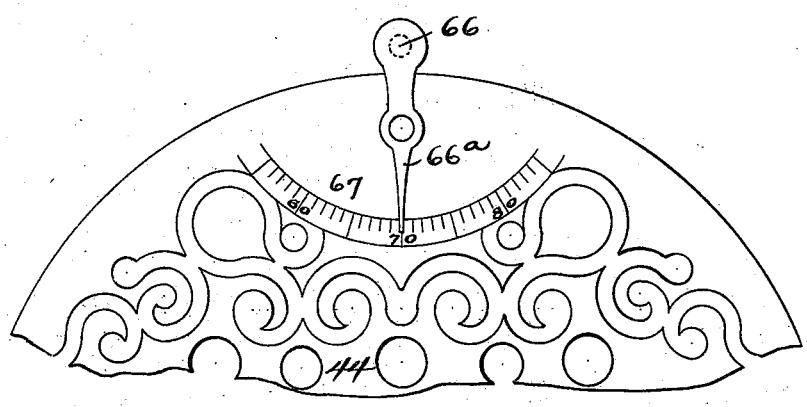

In the drawings, Figure 1 is a sectional elevation showing a valve-casing containing a valve-seat with a valve mounted in proper relation thereto, and showing the motor, escape-valve and their accessories and also a portion of the motor-fluid-supply pipe and a waste-opening therein. Fig. 2 is a plan view of the back of the thermostat. Figs. 3 and 4 are sectional views of the same, said views being at right angles to each other. Fig. 5 is a detail of a valve for controlling the motor-fluid supply. Fig. 6 is a detail of a dial-indicator used in conjunction with our invention, and Fig. 7 is a diagrammatic view showing a practical application of our invention.

In the drawings, let 10 represent the supply-pipe for a heating agent, either steam or hot water, having branches 11 and 12 forming the receiving and discharging outlets for the heating agent, with a valve-seat 13 provided above the inlet. Mounted upon the branch 10 is a fluid-pressure motor, which may be conveniently supported by an exteriorly-threaded hollow plug 14 engaged with threads upon the pipe-section 10. To the upper end of said hollow plug is applied a cap 15 apertured for the passage of the valve-stem 16, and provided with suitable packing 17, constituting a stuffing-box.

To the lower end of the valve-stem is attached a valve 18 and a spring 19, fitted within the chamber of the plug 14, has a bearing upon the bottom thereof at its lower end and at its upper end upon a collar 20 secured to the valve-stem. This spring normally tends to raise the valve 18 from its seat. A spider 21 is supported upon the part 14 and carries at its upper end a flanged ring 22, to which a diaphragm 23 is confined by the shell 24. This shell is pierced to provide a motor-fluid-supply inlet 25. The upper end of the valve-stem is reduced to provide a pin 26, and upon the shoulder thus produced rests a spring 27, which is of a strength sufficient to overcome that of the spring 19. This spring may have an aperture through its center and be maintained on top of the valve-stem by the passing of the pin 26 through such aperture. An inner concave shell 28 is arranged beneath the diaphragm 23 and rests upon the spring 27, forming a piston-plate. Said shell 28 is perforated and a plug 29 is fitted within said perforation, said plug having a concave head 30 resting upon the diaphragm, and its lower end being threaded and provided with a confining-nut 31. A port or passage 32 is provided in this plug and leads into a cavity 33 in the threaded shank of the plug, in which cavity the pin 26 works freely. To this plug is attached the casing 34 of the escape-valve 35, the stem 36 of said escape-valve being connected to a drag 37 of cylindrical form composed of flexible metal and sliding up and down within a casing 40, secured to the shell 24. This casing may be simply threaded to the boss on the shell, as shown in Fig. 1, or it may be constructed as shown in Fig. 8, in which it is threaded within an outer casing 38, the latter being secured to the shell. In this modified construction the casing 40 is provided with a stem 39, which projects through a stuffing-box and is intended for manually closing the valve 18 by turning the casing 40 down into contact with the plug 30 and forcing this plug down, and thus seating the main valve.

A spring $36^a$ is applied to the valve-stem 36, and normally tends to keep the valve closed against the pressure of the motor fluid. In some cases we may enlarge the bore of chamber 40, as at $40^a$, so as to render the drag inoperative and permit the escape-valve to be closed by the spring when the piston-motor is at its highest point and the valve controlling the supply of heat is fully open. The casing 34 has minute escape-apertures 41, which open into the space above the diaphragm, and with which the port 25 is in communication. The motor-fluid-supply pipe, marked 42, is provided with a very small escape-aperture 43, which is permanently open to the atmosphere. Said supply-pipe leads to a thermostat. (Shown in detail in Figs. 2 to 5, inclusive, and in application in Fig. 7.) Said thermostat is of that class in which the thermostatic action is due to the vaporization of a volatile liquid confined within a chamber having a movable wall. As usually constructed such thermostat has a metallic casing constructed in two parts 44 45, of any suitable form in practice, and of circular outline, as shown in the drawings. These frame members may be cast and provided with suitable openings, or may be of skeleton form, to reduce the weight and enhance the appearance. Between said frame members the thermostat is located and composed of the metal sheets 46 47, one or both of which may be flexible. These metal sheets are secured together at their edges and provide a volatile-liquid chamber 48.

To the wall 47 is secured a piston-plate 49, and across said piston-plate extends a spring 50, secured at its ends to the frame 45. To one edge of the frame is pivoted an arm 51 by means of its furcations 52, and said arm extends toward the center of the thermostat about half the distance from the edge of the frame to said center, at which point it is pivotally connected with a lever 53 carrying a set-screw 54, the lower end of which impinges upon the spring 50. The lever 53 has connected thereto a rod 55, which extends through an elastic casing 56 into a valve-chamber 57 formed in the rim of the frame member 45. The elastic casing 56 is fitted tightly over the end of the lever 53 and at the other end to the wall of an opening into the valve-chamber 57, and while permitting a certain amount of movement to the rod 55 it prevents the air from escaping from the chamber 57. The upper end of this valve-casing is provided, preferably, with a threaded plug $57^a$ to afford access to the interior of the valve-chamber, and the latter has a valve-seat 58 to which is adapted a valve 59, carried by the rod 55. A spring 60, interposed between the end of the plug $57^a$ and the valve 59, normally holds said valve upon its seat. A port or passage 61 leads through the casting affording the valve-chamber to a pipe connection 62, and as the parts are shown in the drawings said connection 62 is joined to the supply-pipe 42. (See Fig. 2.) An inlet-pipe 63 has a passage 64, as indicated by the dotted lines in Fig. 2, leading to the valve-chamber 57. By way of said inlet a motor fluid, such as compressed air, is admitted to said chamber, and the flowing of this motor fluid is controlled by the valve 59, which has been referred to herein as the "thermostat-valve."

From the foregoing description of the structure of this thermostat it will be seen that the diaphragm plate or wall 47 is in contact, through the piston-plate 49 and spring 50, with the set-screw 54, carried by the lever 53, to one end of which is attached the rod 55, carrying the thermostat-valve, and to the other end of which is pivoted the lever 51. Therefore the outward movement of the plate 47, due to the expansion of a volatile fluid contained in the chamber 48, will cause a corresponding increased movement of the lever 53 and the raising of the valve 59. There are several ways of regulating the time and extent of this movement. The set-screw 54 affords one means of regulation, and a second and important and novel means of regulation consists in making the pivot of the lever 53 adjustable to and from the diaphragm-plate 47. This, as will be seen, is accomplished by pivoting said lever 53 to the arm 51. Said arm rests upon a cam 65 whose pivot 66 extends through the frame of the thermostat, and the cam swings in the arc of a circle under the arm 51. Said cam-plate has a gradual incline or rise on its acting-face, and by swinging it on its pivot the inner end of the arm 51 may be raised or lowered, thus raising or lowering the pivotal axis of the lever 53 and thereby varying the adjustment of the thermostat, it being obvious that action can be secured at varying temperatures, according to the point at which the lever 53 is set to operate the valve 59. In order to hold the arm 51 down upon the cam 65, we employ a spring $65^a$, whose tension may be varied by the screws $65^b$ working in the slots $65^c$ in the ends of said spring. This spring is stronger than the spring 60 which confines the valve 59 to its seat, so that the latter will yield to permit the said valve to rise when the arm is actuated instead of flexing the spring $65^a$.

To the pivot of the cam 65, but upon the face side of the thermostat, is secured a pointer $66^a$, which is made to swing over a scale indicated upon the dial-plate 67 which covers the face of the thermostat and may be made ornamental, as desired. This scale, as shown, is marked with degrees, according to the Fahrenheit scale, and affords a range of thirty degrees, this being sufficient for all practical purposes of heat regulation. The pointer is shown as indicating "70" on the scale, and, it being assumed that this is the degree of temperature which is existing and which is desired to be maintained in the apartment in which the thermostat is placed, the other parts may be adjusted thereto manually by varying the tension of the spring 50 by means of the screws $50^a$ and manipulating the set-screw 54.

All of the parts being thus in harmony, the action of the thermostat will be as follows: Supposing that a temperature lower than that at which the thermostat is adjusted exists in the apartment, the valve supplying the heating medium being open, the temperature consequently rises until the expansive force of the vapor in the thermostat causes the movable wall of the same to flex against the power of the spring 50, moving same and with it the lever 53 and valve 59. This permits of the passage of the motor fluid into the pressure-motor, and whenever the amount of pressure fluid supplied substantially exceeds that escaping through the relief-orifice the pressure thus secured causes the movement of the diaphragm of the pressure-motor and the action of the drag 37 causes the valve 35 to seat itself, and thus prevents the further escape of the pressure fluid through the aperture 32. This escape being closed the pressure above the diaphragm 29 rapidly increases, resulting in the immediate closing of valve 18, and the same is thereafter held firmly to the seat 13 by this pressure fluid, part of the pressure fluid constantly escaping through the minute opening 43. By this action of the valve 18 the heating medium is cut off from the radiator, which becomes cool and results in a lowering of the temperature of the room. When the room-temperature has lowered sufficiently the pressure in the thermostat becoming less permits the valve 59 to partly or wholly close, whereupon the tension of the pressure fluid gradually escaping through the opening 43 becomes reduced, and when this tension becomes less than the pressure of the spring 27 the preponderating force of the latter results in an upward movement of the piston 28. This movement occurs through the action of the spring 27 before any movement of the valve 18 occurs. The slight upward movement of the piston 28 results through the action of the drag 37 in the opening of the escape-valve 35, whereupon the pressure in the motor-chamber is at once relieved and the valve 18 opens through the action of the spring 19. When this upward movement is finished, the escape-valve 36 remains open, and in order to secure closing action again it is necessary that the thermostat shall cause the admission of enough of the motor fluid to overbalance the escape of same at the apertures 43 and 32, and thus secure a downward movement of the plate 28, closing the escape-valve 36, as before described. If it is desired to secure a more gradual action when the valve is closing, we provide an enlargement of the shell 40 into which the drag 37 raises when the valve 18 is open. This enlargement operates to loosen the drag and the spring $36^a$ causes the valve 35 to close, so that when the thermostat again admits the motor fluid the piston 28 will at once begin its downward movement and gradually close the valve 18 as the pressure of the motor fluid increases. The action when opening the valve is the same as before described. If a different temperature is desired, the index 66ᵃ is shifted to the proper point, and this carries with it the cam 65, and results in a change in the position of the pivotal axis of lever 53 and a consequent difference in the point at which the spring 50 will cause movement of the lever and valve 59.

We claim—

1. In a heat-regulating apparatus, the combination with a valve controlling the flow of the heating medium, of a fluid-pressure motor operatively connected with said valve, a means controlling the supply of motor fluid, an escape-opening from the motor-fluid chamber, and a valve controlling the escape-opening, and operated by the initial movement of the motor, whereby to automatically control said escape-opening, substantially as described.

2. In a heat-regulating apparatus, the combination with the valve controlling the flow of the heating medium, of a fluid-pressure motor operatively connected with said valve, a thermostat controlling the supply of motor fluid, an escape-opening from the motor-fluid chamber, and a valve controlling the escape-opening and operated by the initial movement of the motor whereby to automatically control said escape-opening substantially as described.

3. In a heat-regulating apparatus, the combination with a valve controlling the flow of the heating medium, of a fluid-pressure motor operatively connected with said valve, a thermostat controlling the supply of motor fluid, an escape-opening from the motor-fluid chamber, a valve controlling the escape-opening and operated by the movement of the motor, and a spring resisting the action of the fluid-pressure motor, substantially as described.

4. In a heat-regulating apparatus, the combination with a main valve controlling the flow of the heating medium, of a fluid-pressure motor adapted to operate said valve, means governing the supply of motor fluid, an escape-valve controlling the discharge of the fluid from the motor-chamber, and controlled by the motor, and a movable anchorage for the escape-valve, substantially as described.

5. In a heat-regulating apparatus, the combination with a main valve for controlling the supply of a heating agent, a fluid-pressure motor operatively connected to and adapted to close said valve, a thermostat for controlling the motor-fluid supply, an escape-opening from the motor-fluid chamber, a valve for controlling said escape-opening, a drag connected to one part of said valve and adapted to maintain said part against movement during the initial movement of the motor-piston, substantially as described.

6. The combination with a main valve of a fluid-pressure motor for operating said valve, a movable anchorage, means for controlling the discharge of fluid from the fluid-chamber of said motor, said means including a valve and valve-seat, one of which is movable relatively to the other, and is connected with the movable anchorage.

7. In a heat-regulating apparatus, the combination with a main valve for controlling the heating agent, a hollow plug connected to the main-valve casing and through which the valve-stem passes, a stuffing-box applied to the end of the hollow plug around the valve-stem, a spring arranged within the hollow of the plug between the stuffing-box and the valve and having a bearing at one end upon the plug and at the other upon the valve-stem and a fluid-pressure motor adapted to move the valve in one direction and against the spring action, substantially as described.

8. In a heat-regulating apparatus, the combination with a main valve for controlling the supply of a heating agent, a valve-stem, a plate-spring bearing upon said valve-stem, a pressure-fluid motor having a piston-plate bearing upon the margins of said spring and normally supported out of contact with said spring at its middle, substantially as and for the purpose described.

9. In a heat-regulating apparatus, the combination with a main valve for controlling the supply of a heating agent, of a pressure-fluid motor for operating said valve, a pressure-thermostat for controlling the supply of the motor fluid, an escape-opening from the motor-chamber to the atmosphere, a valve for controlling said escape-opening, a drag for restraining said escape-valve and a spring normally tending to close the same, substantially as and for the purpose described.

10. In a heat-regulating apparatus, the combination with the main valve for controlling the supply of a heating agent, of a pressure-fluid motor for operating said valve, a thermostat for controlling the supply of a pressure fluid, an escape-opening from the pressure-motor chamber to the atmosphere, a valve for controlling the escape-opening, a drag connected with said valve and tending to restrain the motion thereof, a casing upon which the drag operates, said casing being movable with relation to the motor-piston and whereby the latter may be manually operated to close the main valve, substantially as described.

11. In a heat-regulating apparatus, the combination with a main valve and a pressure-fluid motor for operating said valve, an escape-opening from the pressure-motor chamber to the atmosphere, a valve for controlling said escape-opening, a drag connected with said valve, a casing upon the walls of which the drag operates, said casing having an enlargement at its end opposite the valve and a spring operating to close the escape-valve, substantially as described.

12. In a heat-regulating apparatus, the combination with a main valve, a pressure-fluid motor, a thermostat for controlling the supply of the pressure fluid, said thermostat having a movable wall or diaphragm, an arm pivotally connected to the frame of the thermostat, means for moving said arm upon its pivot, a lever pivotally connected with said arm and carrying the valve for controlling the motor-fluid supply and adapted to be actuated by the movement of the movable wall or diaphragm in one direction, substantially as described.

13. The combination with a thermostat having a movable wall or diaphragm-plate, an arm pivotally connected to the frame of the thermostat, a lever pivotally connected to the end of said arm, a cam for varying the angular position of the arm and a spring for holding said arm down upon the cam, substantially as described.

14. The combination with a fluid-pressure thermostat having a movable wall, a piston-plate, a spring bearing upon said piston-plate and means for varying the tension of said spring, a pivoted arm arranged in proximity to the movable wall and adapted to be engaged thereby and the pivotal support of said arm being movable to and from the movable wall or diaphragm, substantially as described.

15. The combination with a fluid-pressure thermostat having a movable diaphragm or wall, a pivoted lever adapted to be rocked upon its pivot by the movement of the wall in one direction, a motor-fluid valve-chamber having inlet and outlet openings, a valve adapted to control one of said openings, said lever having an extension carrying said valve and an elastic or yielding casing connecting the valve-chamber with said arm, substantially as and for the purpose described.

16. The combination with a thermostat having a movable wall or diaphragm, an operating-lever mounted in proximity to said wall, a pivoted arm on which said lever is fulcrumed, means for shifting the fulcrum of said lever and an adjusting-screw carried by said lever for adjusting the same, substantially as and for the purpose described.

WILLIAM P. POWERS.
FRED W. POWERS.

Witnesses:
   E. L. HUBER,
   N. M. BOND.